(12) United States Patent
Bullis (10) Patent No.: US 7,758,094 B2
(45) Date of Patent: Jul. 20, 2010

(54) TWO PART AUTOMOBILE

(76) Inventor: James K. Bullis, 1155 Pimento Ave., Sunnyvale, CA (US) 94087

(*) Notice: Subject to any disclaimer, the term of this patent is extended or adjusted under 35 U.S.C. 154(b) by 0 days.

(21) Appl. No.: 12/283,552

(22) Filed: Sep. 11, 2008

(65) Prior Publication Data

US 2010/0060030 A1 Mar. 11, 2010

(51) Int. Cl.
*B62D 25/00* (2006.01)
(52) U.S. Cl. ...................................... 296/61
(58) Field of Classification Search ................ 296/61, 296/1.07, 165, 180.1, 219, 180.4, 180.5; 280/149.2
See application file for complete search history.

(56) References Cited

U.S. PATENT DOCUMENTS

| | | | | | |
|---|---|---|---|---|---|
| 1,501,530 | A | * | 7/1924 | Driggs | 244/49 |
| 1,872,845 | A | * | 8/1932 | Sullivan | 244/7 R |
| 2,262,762 | A | * | 11/1941 | Hicks | 244/102 R |
| 2,384,997 | A | * | 9/1945 | Hansson | 244/113 |
| 2,517,509 | A | * | 8/1950 | Sikorsky | 244/17.11 |
| 2,577,385 | A | * | 12/1951 | Troendle | 244/102 R |
| 2,668,027 | A | * | 2/1954 | Burnelli | 244/81 |
| 2,781,226 | A | * | 2/1957 | Walter | 244/118.2 |
| 2,923,494 | A | * | 2/1960 | Strong | 244/2 |
| 2,953,322 | A | * | 9/1960 | Lewis | 244/46 |
| 3,128,068 | A | * | 4/1964 | Pauli | 244/129.5 |
| 3,576,300 | A | * | 4/1971 | Palfreyman | 244/36 |
| 4,201,412 | A | * | 5/1980 | Williams et al. | 296/163 |
| 4,437,698 | A | * | 3/1984 | Tantalo | 296/180.3 |
| 4,625,825 | A | * | 12/1986 | Ethier | 180/24 |
| 4,841,871 | A | * | 6/1989 | Leibowitz | 104/23.1 |
| 5,116,069 | A | * | 5/1992 | Miller | 280/5.509 |
| 5,137,413 | A | * | 8/1992 | Ressler | 414/474 |
| 5,201,478 | A | * | 4/1993 | Wooley | 244/2 |
| 5,401,055 | A | * | 3/1995 | Pham | 280/755 |
| 5,584,369 | A | * | 12/1996 | Makino et al. | 191/55 |
| 5,626,310 | A | * | 5/1997 | Kelly | 244/2 |
| 5,908,217 | A | * | 6/1999 | Englar | 296/180.1 |
| 6,123,295 | A | * | 9/2000 | Wexler et al. | 244/172.3 |
| 6,792,872 | B1 | * | 9/2004 | Valdespino | 104/22 |
| 6,908,128 | B2 | * | 6/2005 | Strong | 293/128 |
| 7,131,613 | B2 | * | 11/2006 | Kelly | 244/171.4 |
| 7,303,037 | B2 | * | 12/2007 | Yatagai et al. | 180/190 |
| 2007/0018037 | A1 | * | 1/2007 | Perlo et al. | 244/45 R |
| 2008/0295595 | A1 | * | 12/2008 | Tacklind et al. | 73/462 |
| 2009/0014585 | A1 | * | 1/2009 | Gygax | 244/119 |
| 2009/0044991 | A1 | * | 2/2009 | Bullis | 180/24.07 |

* cited by examiner

*Primary Examiner*—Kiran B. Patel (57) ABSTRACT

The invention is a two part wheeled vehicle that has an upper part that is an aerodynamic shell and a lower part that is a wheel system. This vehicle is constructed to hold the shell at a height above the road that allows significant air flow under the shell, thus causing improved aerodynamic performance. This elevated shell is built to eliminate side door openings to allow uninterrupted protective side structure. Access involves opening the shell to allow entry to a sitting position that is protected by the side structure. Closure restores the aerodynamic properties of the shell. Seats are movable such that a walkway is made clear for motorists to walk to a position ahead of their respective seats. A car roof top can be opened to enable motorists to walk, nearly erect, into the vehicle.

4 Claims, 11 Drawing Sheets

TWO PART AUTOMOBILE

This patent document contains material that is subject to copyright protection. Facsimile reproduction is allowed of the patent document or the patent disclosure as it appears in the Patent and Trademark Office patent file or records as allowed by US patent law, but otherwise all copyright rights are reserved.

CROSS REFERENCE TO RELATED APPLICATIONS

Published Patent Application 2009-0044991 A1 Bullis, filed Aug. 16, 2007

BACKGROUND OF THE INVENTION

1. Field of the Invention

This present invention relates to motor vehicles.

2. Description of the Prior Art

U.S. Pat. No. 7,338,061 Bullis 2008 provided a wheel system that makes a narrow car stable, thus enabling major improvements in aerodynamic efficiency. Using this wheel system with a tandem seating arrangement, a car concept resulted that was about half as wide as a conventional car. Therefore, frontal area would be much reduced, thus reducing one factor that determines air drag force. Very efficient shapes were then disclosed in Patent Application 2009-0044991 A1 Bullis, filed Aug. 16, 2007 which resulted in a large reduction in the drag coefficient, which is a second factor that determines air drag force. The resulting car would eliminate much of the fuel efficiency problem that comes from driving cars at highway speeds. The narrow car with tandem seating was discussed with inclusion of protective structure built into the sides of the vehicle. Entry from the top of the vehicle was shown. However, it seemed that side entry would be needed to make the car popular. This new car concept was so big a change from traditional automotive practice, it seemed like a good opportunity to avoid the traditional, but unsafe, side door systems.

At the same time, it was seen to be very important to take advantage of car safety developments where front and rear crumple zones, where structure prevented crash effects from reaching occupants, yet allowed for significant energy absorption. Amazingly, unless cars are quite wide, the predisposition of the auto industry to side-by-side seating leaves little side space for such protective crumple zones. Side doors cause further vulnerability to side impacts. It is not clear that air-bags are of much use in making up for these defects in design.

The Isetta is a known automobile where the front opens to allow two persons to step up and sit on a fixed seat. In this car the driver and passenger sit side-by-side just behind the combination front door and windshield.

SUMMARY OF THE INVENTION

An embodiment is a two part, wheeled vehicle for tandem seating of motorists that has an elevated aerodynamic shell that is held above the wheels at a height that allows significant air flow under the vehicle.

Protective side structure is uninterrupted for purposes of allowing entry through side openings. Therefore, a ramp system provides a walk in entry pathway to the vehicle shell when this ramp lowers from the bottom of this shell. Seats are movable such that a walkway is made clear for motorists to walk to a position ahead of their respective seats, from which position they would then be able to move their seats to the necessary position for riding in the car. A roof top can be opened to enable motorists to walk, nearly erect, into the vehicle.

There are various possible access arrangements based on this concept.

DETAILED DESCRIPTION OF AN EMBODIMENT AND VARIATIONS

The embodiment design is part of a project to adapt airship research to the automotive field. Airship research carried out prior to WWII provides a high performance aerodynamic body shape that is here used as a carriage to enclose persons riding in the automobile. Wind tunnel tests were carried out in those years producing air drag force measurement data that can be used to design this high efficiency automobile. This data is especially complete for the USS Akron shape, even including drag force data for the model at a variety of pitch angles. For vehicle speeds of interest the drag force can be quite accurately determined, especially for data from one of the models that is approximately the same as the intended automobile, that data being reported by H. B. Freeman, Force Measurements on a 1/40-scale model of the U.S. Airship "Akron", NACA Report No. 432, 1932.

This airship is a highly refined version of the general shape known as a body of revolution having its axis aligned with the car's travel direction. To make such a form large enough to give adequate head room for a large person, a width is needed that is somewhat more than half the width of an ordinary car. Rather than work to make this car thinner, it was decided to take advantage of the side space to make a product that would be as safe as possible. Building in a strong protective side structure was thus seen as an important design objective. However, this protection would be significantly degraded by cutting it to make side door openings.

There are obvious limits to car length, but there is more flexibility here than there is in car width if aerodynamic drag is a primary concern. Thus, the fore and aft crumple zones can be made significantly large, and there is still some opportunity to provide for access through such zones, while retaining substantial crumple zone protection.

Figure 1:
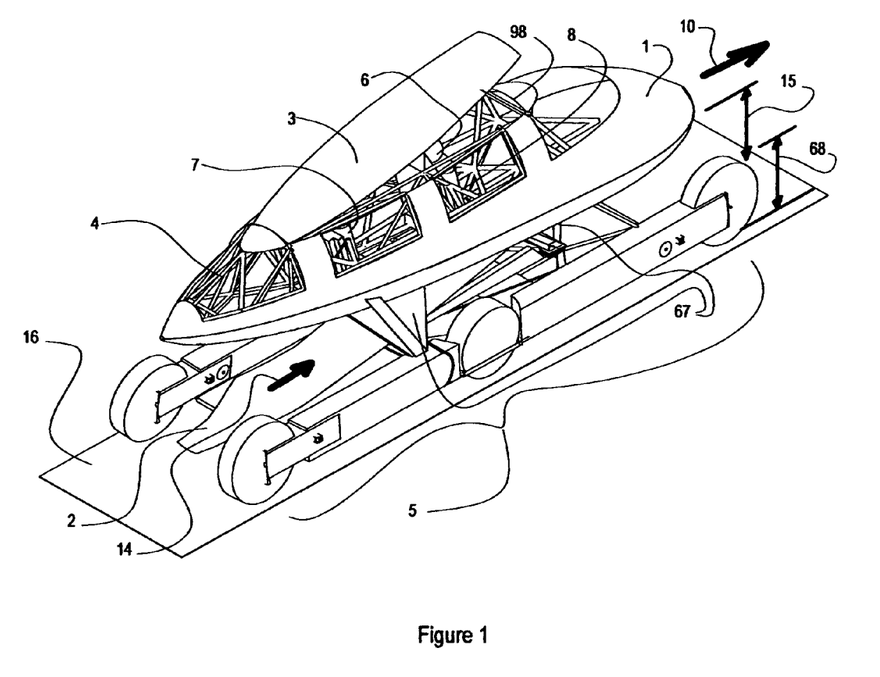
FIG. 1—Example showing two part vehicle with hatches open.

FIG. 1 shows an embodiment that is a two part vehicle for operation on a roadway 16, where the two part vehicle has an upper part 1 and a lower part 5. The upper part 1 is a carriage 1 where a motorist 6,7 rides. The lower part 5 is a wheel system 5 that enables operation on the roadway 16. The carriage 1 is supported on the wheel system 5 in an elevated 15 position above the roadway 16 by supporting structure 67.

Figure 8:
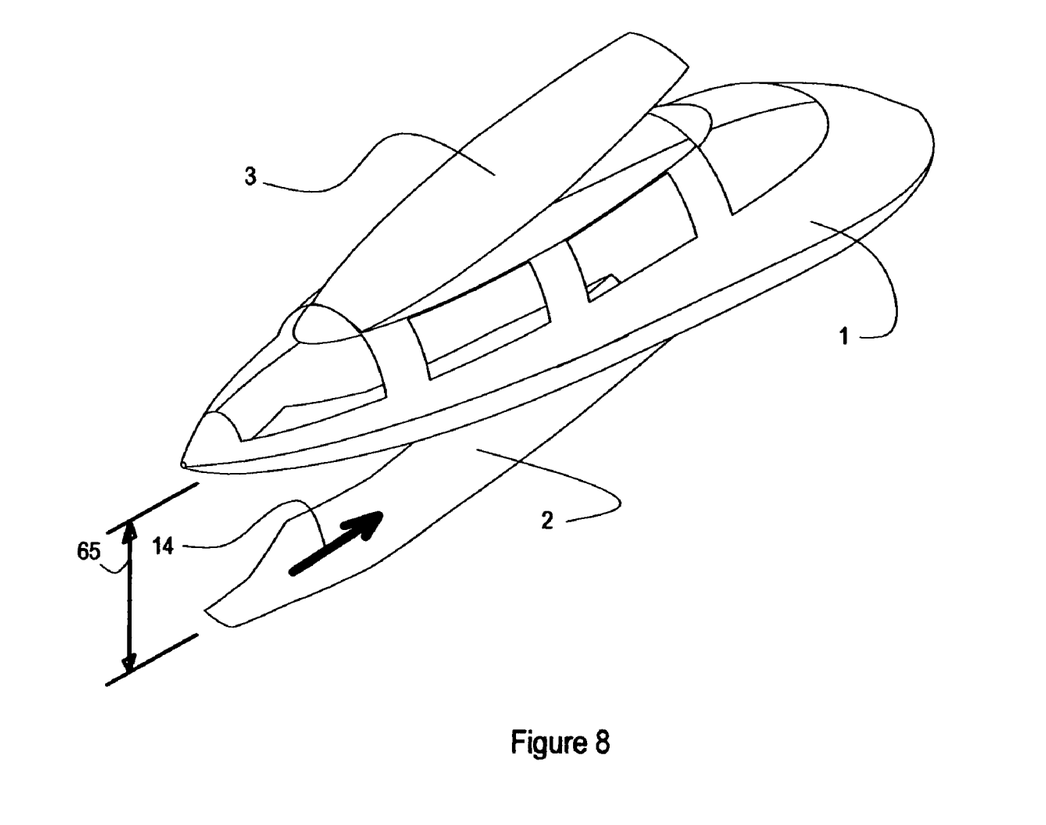
FIG. 8—Aerodynamic shell with opening parts.

The carriage 1 is an aerodynamic shell 1 having an outer surface shaped to minimize aerodynamic drag on the carriage 1 when traveling as indicated by motion vector 10. This carriage 1 is fitted with an access ramp 2 that is shown in lowered position 2, along with a cut-out of the shell that makes an opening in the carriage 1 bottom. The carriage 1 is also fitted with a roof top 3 that is shown in a tipped up position 3. FIG. 8 further aids in visualizing the shell and openings that enable access through the vehicle bottom.

Protective rear structure 4 within the shell 1 is connected to side structure which is connected to the wheel system 5 by supporting structure 67 that serves to elevate the aerodynamic shell 1 above the roadway 16 to an indicated elevation height 15. The supporting structure 67 acts to distinctly separate the wheel system 5 from the elevated aerodynamic shell 1. The indicated elevation height 15 is above the top of wheels as indicated 68. Placeholders 6, 7 show provisions for seating of two motorists in tandem. Access pathway indicating arrow 14 shows the rear entry path up the ramp 2. As motorists walk upwards to higher positions, the top opening gives increasing head clearance height. The intended forward travel direction is indicated by the arrow 10. FIG. 1 also shows the wheel system 5 as three wheels on each side arranged in a horizontal column with gaps filled in between the wheels. The ramp 2 is shown in lowered position where it lies between the right side and left side horizontal wheel columns. Aerodynamic force is indicated in FIG. 3 by arrow 99.

When the top 3 is open it leaves a cut-out opening 98 that is exactly closed when the top 3 closes. The surface piece that is cut out of the opening is indicated the same as the top 3.

Figure 2:
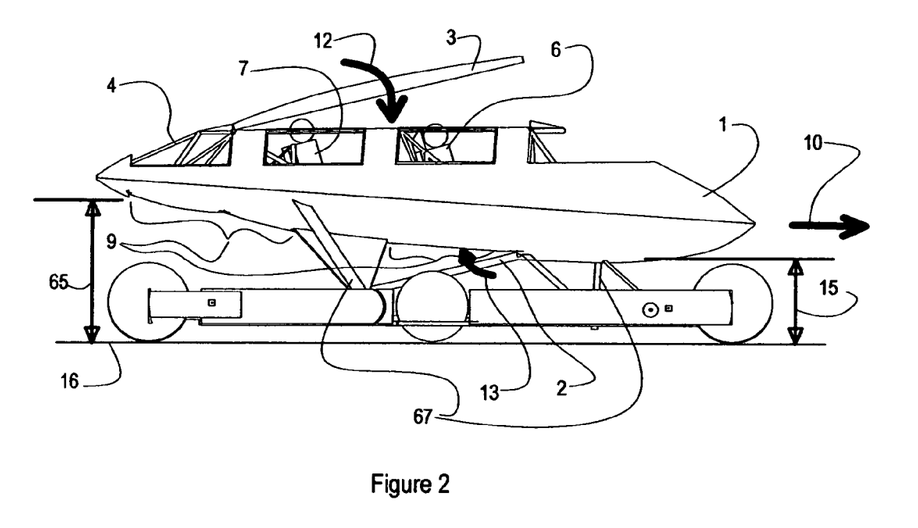
FIG. 2—Side view showing hatch actions.

FIG. 2 shows a side view where the lower rear opening 9 of the shell can be seen, where it is shaped to enable to give head and upper body clearance as the motorist walks up into the vehicle from underneath. Ramp 2 and the ramp closing action 13 are indicated as an angular motion of the ramp 2. The top 3 and the top closing action 12 are also indicated. Rear height of the vehicle above roadway 16 is here indicated 65 which is notable for enhancing head clearance whereby motorists can walk nearly erectly into the rear end of the vehicle. Height of lowest point on vehicle above roadway 16 is here viewable as indicated by height indicator 15. Supporting structure 67 as shown here is configured such that the entry walkway is convenient from the rear and the ramp 2 is arranged accordingly.

Figure 3:
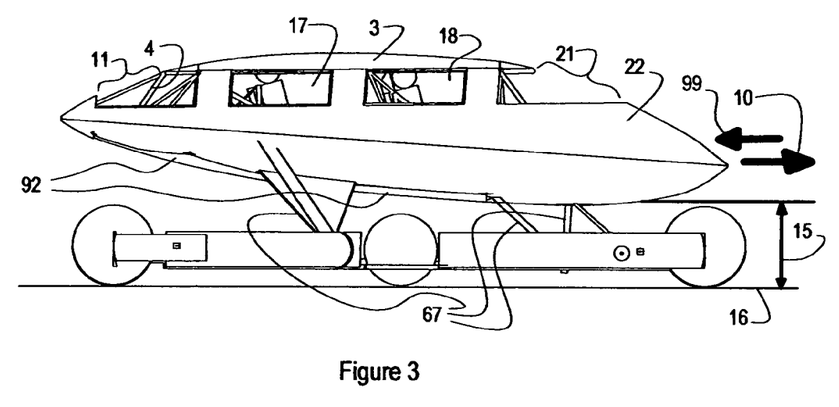
FIG. 3—Vehicle arranged for high speed travel.

FIG. 3 shows the shell as a closed body 22 that gives the efficient aerodynamic shape. A surface 92 fully closes the now low drag aerodynamic body 22. Ramp 2 is attached to the inside of that closing surface 92. Top 3 is also shown in traveling position. Rear window 11, windshield 21, and side windows 17, 18 are indicated. Thus, this figure illustrates the smooth aerodynamic surface that is intended for road travel operation in the direction indicated 10 with the resulting aerodynamic drag farce on the closed body as indicated 99.

Figure 4:
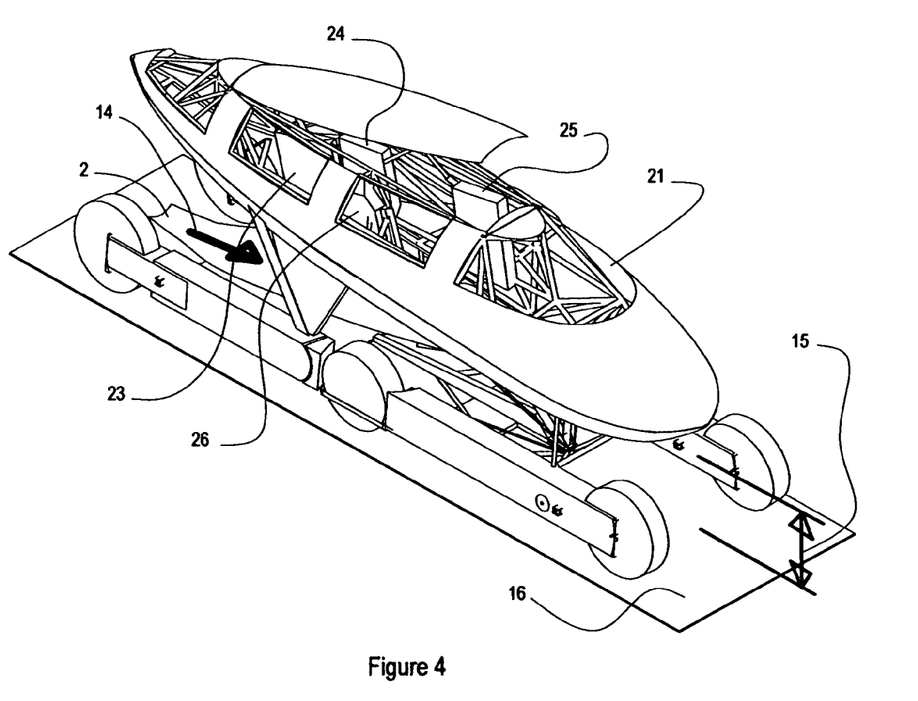
FIG. 4—Seating arranged to allow an access pathway by moving seats from normal positions for seated operation to out of the path positions.

FIG. 4 shows the seat backs 23, 26 swung on hinges to the side and seat bottoms 24, 25 folded up such that there is a clear access path from the rear to seating positions of the respective motorists.

Figure 5:
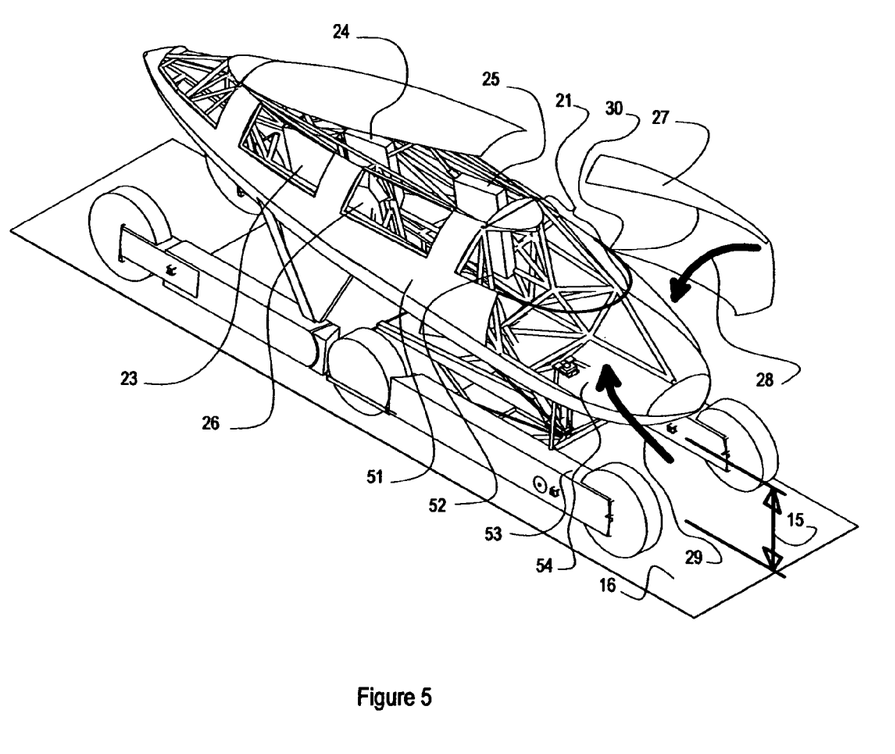
FIG. 5—Front access variation.

An equivalent embodiment shown in FIG. 5 shows the same conditions for boarding as FIG. 4 except a front access variation is illustrated. Here the front hood 27 is hinged at hinge point 30 at the side to open the shell with a front cut-out 54. After motorists step up on step point 53 and enter as the arrow 29 indicates, the front hood 27 swings 28 to close the shell 51 to fill the front cut-out 54. This front cut-out is the front access counterpart of the rear cut-out 9 of FIG. 2 for the rear access version. Frontal crush zone structure 52 is arranged to enable passage. Step point 53 fulfills the functional purpose of the rear access ramp 2 of FIG. 1, as a simplified counterpart of that rear access ramp 2

Figure 6:
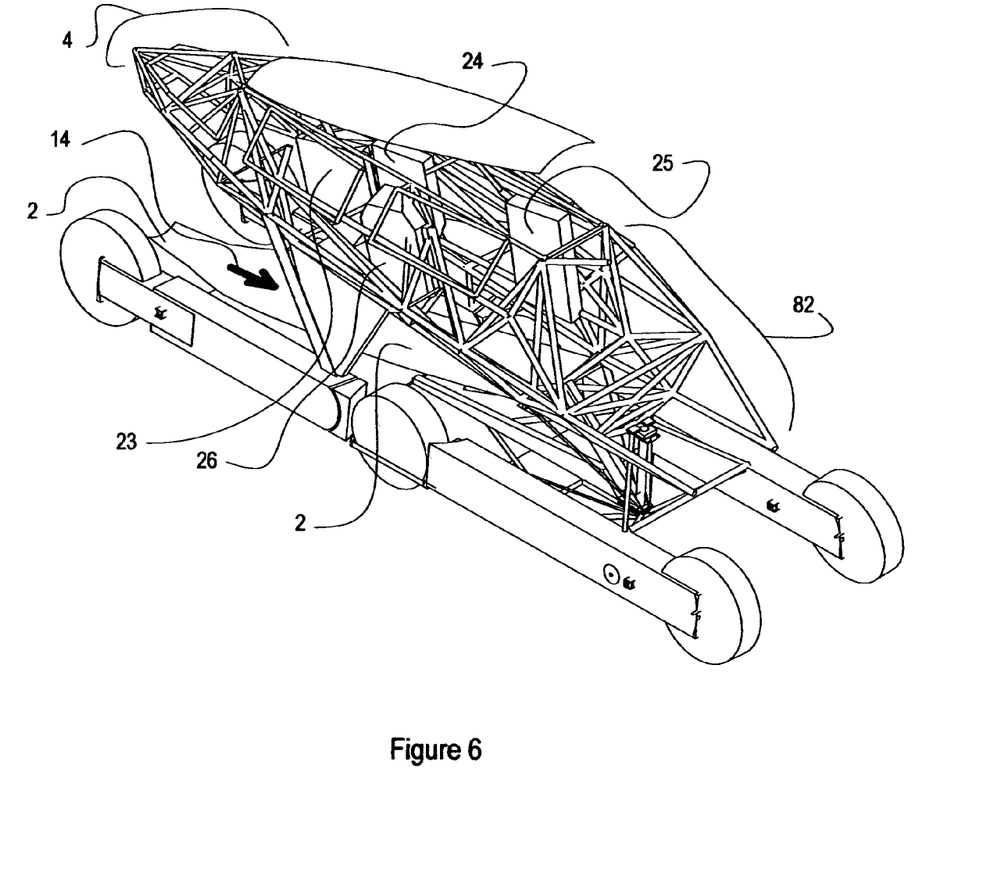
FIG. 6—Vehicle with aerodynamic shell removed showing protective structure and to show seats moved for access.

Returning to the initial example embodiment, FIG. 6 shows the vehicle with the aerodynamic shell removed so that the parts previously pointed out can be seen. This is especially useful to see how the seat parts 23, 24, 25, 26 are moved to allow a clear pathway. Structure of rear crush or crumple zone 4 is also indicated here, with tie in as indicated in FIG. 1 between the rear crumple zone 4 and protective side structure 8 much more clearly visible. The corresponding forward crush or crumple zone structure 82 is visibly connected to that protective side structure 8. This view is also useful for pointing out the integrated frame under-structure that is covered by the aerodynamic shell 1 of FIG. 1.

Figure 7:
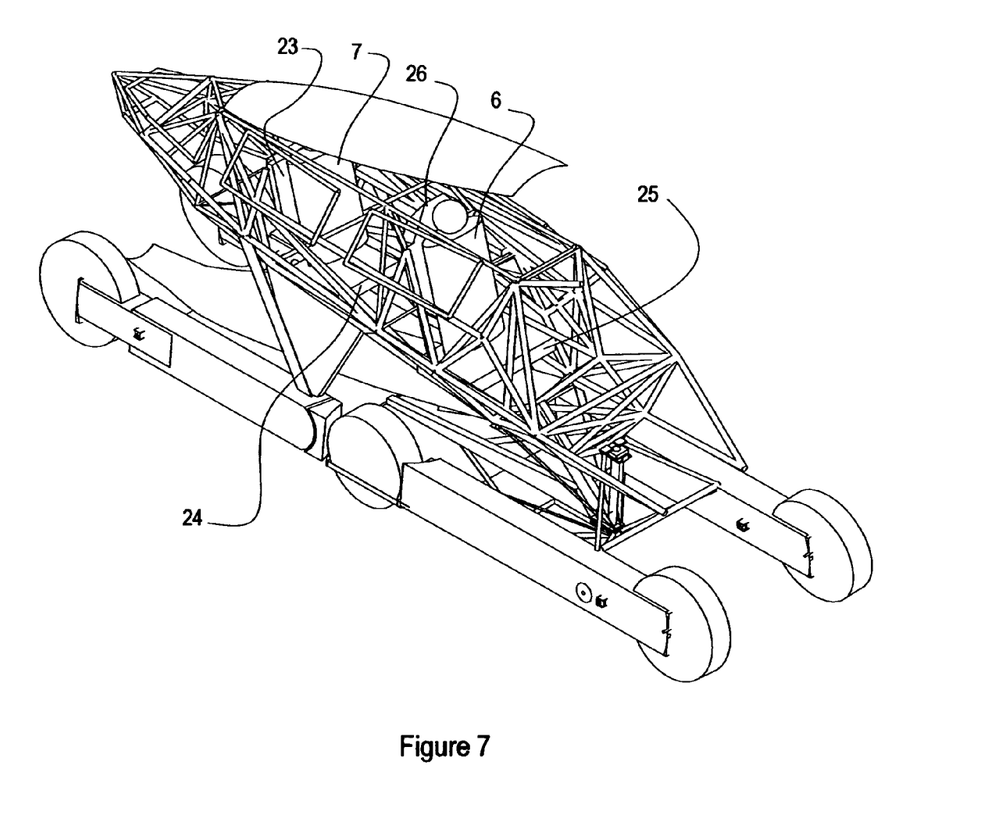
FIG. 7—Placeholders showing motorist positions on seats arranged for riding.

FIG. 7 illustrates the seated position where motorists are represented by placeholders 6, 7 sitting on seat parts 23, 24, 25, 26 moved appropriately into place for traveling.

FIG. 8 shows the basic shell 1 of the first example of FIG. 1 with opening parts 2,3 and rear entry pathway 14 as before. This is the scaled shape of the USS Akron airship with minor shape modifications. Elevation height of the rear part of the vehicle is indicated by a height indicator 65.

Figure 9:
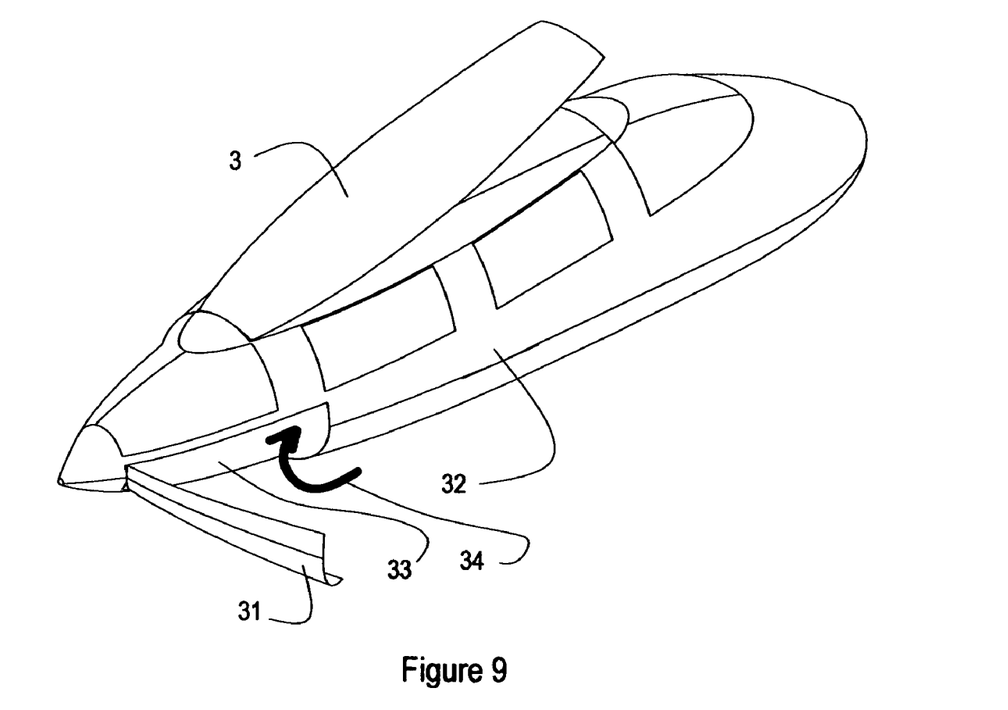
FIG. 9—Rear side access.

FIG. 8 is a reference for FIG. 9 where a variation on the rear ramp is shown as a side opening hatch cover 31 that opens a cut-out shape 33 in a modified shell 32. This is of course, a side door, but it is set well to the rear of the point where it would be a structural weakness that would be a side impact danger. The entry pathway is indicated by the arrow 34. The top 3 here opens as before for headroom as a person would need to move under the vehicle for entry. It also provides an emergency exit, here as well in previous configurations.

Figure 10:
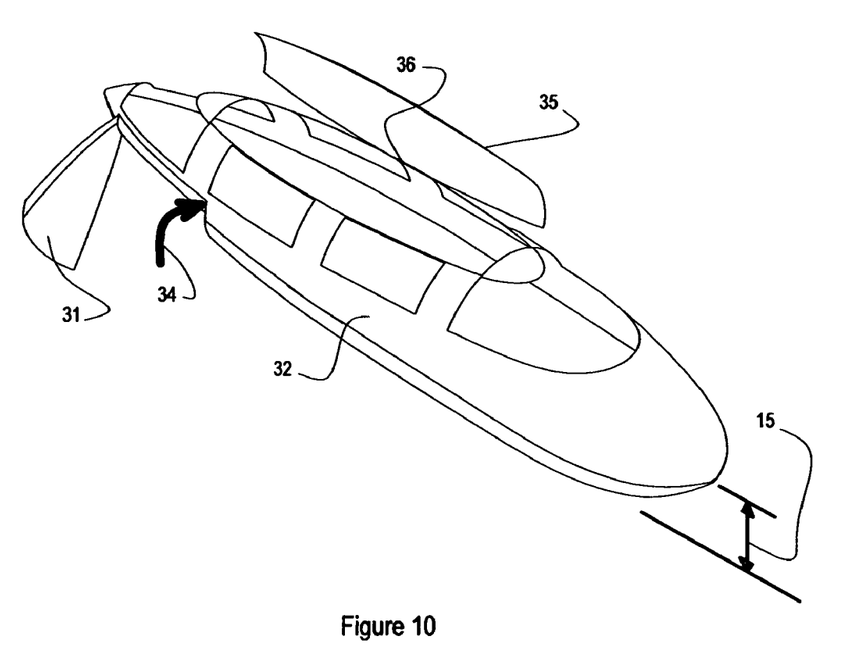
FIG. 10—Top hinging variation.

FIG. 10 shows a more useful way to give head clearance for the rear side entry. In this case, the top 35 hinges at a side point 36. Except for the top change, this variation is the same example shown in FIG. 9. It is the same elevation height 15 above the road as all the previous examples, thus access is from underneath, with side clearance added.

Figure 11:
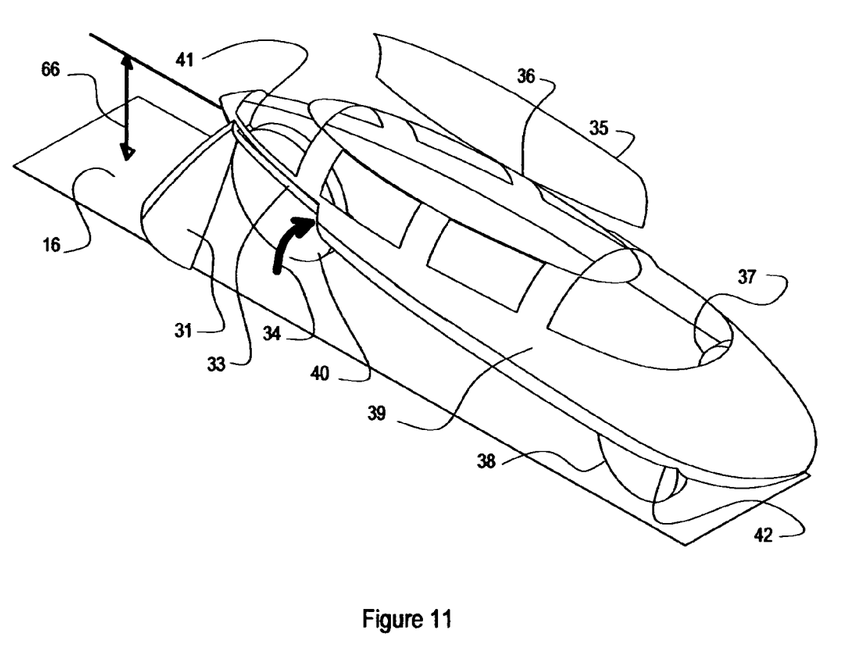
FIG. 11—Integrated wheel variation.

FIG. 11 shows a variation based on the previous variations, except here it involves an aerodynamic vehicle with integrated wheels. Here the elevation above the roadway 16 as indicated 66 enables aerodynamic operation equivalent to that of the two part vehicle. Hatches open as before in FIG. 10, but now there are wheels 40, 38, 37 directly attached to a modification of the aerodynamic body 32 of FIG. 10. With cut-outs 41, 42 and another not shown for the left front side wheel, the body is modified to become the wheel attached aerodynamic body 39. Fairings minimize the gaps that would otherwise cause much unwanted aerodynamic drag. The body of FIG. 11 is an exact copy of the body of FIG. 10 except for the wheel openings 41,42.

Examples with variations have been here provided to show the invention with some of its equivalents. The scope of the invention is to be determined by the appended claims.

I claim:

1. A two part vehicle for operation on a roadway, where said two part vehicle includes an upper part and a lower part, where said upper part is a carriage wherein a motorist rides, and where said lower part is a wheel system that enables said operation on a roadway where said carriage outer surface determines aerodynamic drag force on said carriage when it is traveling, where said carriage is supported on said wheel system such that said carriage is carried at an elevation height to enable significant air flow under said carriage such that said aerodynamic drag force is reduced due to said elevation height of said outer surface above said roadway, where said carriage includes protective side structure within said outer surface, where said carriage is constructed to allow entry to a sitting position that is protected by said side structure, and where said carriage is provided with a top that opens to give an upper cut-out opening that is a cut-out from said outer surface, with capability to close said upper cut-out opening that involves placing a cut-out piece of said outer surface shaped like said upper cut-out opening in position to enable a smooth aerodynamic carriage surface, where said upper cut-out opening enables said motorist to walk nearly erectly into said vehicle.

2. A vehicle according to claim 1 where said entry is enabled by movement of seats to clear an intended passageway.

3. A vehicle according to claim 1 that is arranged for tandem seating of a plurality of motorists.

4. A vehicle according to claim 1 where there is a distinct separation between said carriage and wheels.

* * * * *